(12) United States Patent
Chen et al.

(10) Patent No.: US 12,430,776 B2
(45) Date of Patent: Sep. 30, 2025

(54) METHOD AND APPARATUS WITH OBJECT TRACKING

(71) Applicant: Samsung Electronics Co., Ltd., Suwon-si (KR)

(72) Inventors: Yiwei Chen, Beijing (CN); Siyang Pan, Beijing (CN); Jiaqian Yu, Beijing (CN); Changbeom Park, Suwon-si (KR); Hyunjeong Lee, Suwon-si (KR); Seohyung Lee, Suwon-si (KR); Byung In Yoo, Suwon-si (KR); Qiang Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 311 days.

(21) Appl. No.: 18/355,725

(22) Filed: Jul. 20, 2023

(65) Prior Publication Data

US 2024/0046486 A1 Feb. 8, 2024

(30) Foreign Application Priority Data

Jul. 29, 2022 (CN) .......................... 202210910093.6
Mar. 8, 2023 (KR) ......................... 10-2023-0030463

(51) Int. Cl.
*G06T 7/246* (2017.01)
*G06T 7/215* (2017.01)

(52) U.S. Cl.
CPC .............. *G06T 7/248* (2017.01); *G06T 7/215* (2017.01); *G06T 2207/10016* (2013.01); *G06T 2207/20076* (2013.01); *G06T 2207/20081* (2013.01); *G06T 2207/20084* (2013.01)

(58) Field of Classification Search
CPC ..................... G06T 7/248; G06T 7/215; G06T 2207/10016; G06T 2207/20076; G06T 2207/20081; G06T 2207/20084
See application file for complete search history.

(56) References Cited

U.S. PATENT DOCUMENTS 10,558,891 B2 2/2020 Wang et al.
2010/0013917 A1 1/2010 Hanna et al.
2011/0129119 A1* 6/2011 Eggert ...................... G06T 7/20
382/103

(Continued)

FOREIGN PATENT DOCUMENTS

JP 2022-515895 A 2/2022

OTHER PUBLICATIONS

Ma et al. (Adaptive Correlation Filters with Long-Term and Short-Term Memory for Object Tracking, Mar. 23, 2018). (Year: 2018).*

(Continued)

*Primary Examiner* — Wassim Mahrouka
(74) *Attorney, Agent, or Firm* — NSIP Law

(57) ABSTRACT

A method and apparatus with object tracking is provided. The method includes generating a mixed filter by fusing a short-term filter with a long-term filter; and performing object tracking on a current frame image based on the mixed filter. The short-term filter is dependent on a prediction of the current frame image in a video sequence, and the long-term filter is a previously generated long-term filter or is generated by optimizing the previously generated long-term filter based on an object template feature pool.

20 Claims, 7 Drawing Sheets

(56) References Cited

U.S. PATENT DOCUMENTS

2018/0137632 A1* 5/2018 Takada ............... G06V 30/248
2022/0138493 A1 5/2022 Lee et al.

OTHER PUBLICATIONS

Tang et al. (High-speed Tracking with Multi-kernel Correlation Filters, Jun. 17, 2018). (Year: 2018).*
Li, Shuai, et al. "A dual weighting label assignment scheme for object detection." *Proceedings of the IEEE/CVF Conference on Computer Vision and Pattern Recognition.* 2022.
Yan, Bin, et al. "Alpha-refine: Boosting tracking performance by precise bounding box estimation." *Proceedings of the IEEE/CVF Conference on Computer Vision and Pattern Recognition.* 2021.
Mao, Yunyao, et al. "Joint inductive and transductive learning for video object segmentation." *Proceedings of the IEEE/CVF international conference on computer vision.* 2021.
Bhat, Goutam, et al. "Learning discriminative model prediction for tracking." *Proceedings of the IEEE/CVF international conference on computer vision.* 2019.
Mayer, Christoph, et al. "Transforming model prediction for tracking." *Proceedings of the IEEE/CVF conference on computer vision and pattern recognition.* 2022.

* cited by examiner

METHOD AND APPARATUS WITH OBJECT TRACKING

CROSS-REFERENCE TO RELATED APPLICATIONS

This application claims the benefit under 35 USC § 119(a) of Chinese Patent Application No. 202210910093.6 filed on Jul. 29, 2022, in the China National Intellectual Property Administration, and Korean Patent Application No. 10-2023-0030463 filed on Mar. 8, 2023, in the Korean Intellectual Property Office, the entire disclosures of which are incorporated herein by reference for all purposes.

BACKGROUND

1. Field

The following description relates to a method and apparatus with object tracking.

2. Description of Related Art

Visual object tracking technology plays a critical role in computer vision. More specifically, visual object tracking technology continuously predicts a bounding box of an object in a subsequent frame image according to a first frame image and the bounding box of the object in a video sequence. The visual object tracking technology aims to extract template information according to an object indicated in a first image frame, calculate a matching level between the template information and different candidate positions in a search region of a subsequent video frame, and determine a position of the object by selecting a position having the greatest matching level.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor-implemented method includes generating a mixed filter by fusing a short-term filter with a long-term filter; and performing object tracking on a current frame image based on the mixed filter, wherein the short-term filter is dependent on a prediction of the current frame image in a video sequence, and the long-term filter is a previously generated long-term filter or is generated by optimizing the previously generated long-term filter based on an object template feature pool.

The method may further include, prior to the generating of the mixed filter, predicting the short-term filter based on a first frame image of the video sequence, the current frame image and an auxiliary frame image of the video sequence, wherein the auxiliary frame image may be an image frame that has a determined greater tracking success confidence than a first threshold value and is closest to the current frame image in time sequence.

The predicting of the short-term filter may include extracting features, through a feature extraction network, for a first search region from the first frame image, an auxiliary search region from the auxiliary frame image, and a current search region from the current frame image, and extracting a first deep feature of the first search region, an auxiliary deep feature of the auxiliary search region, and a current deep feature of the current search region; generating an object state encoding vector by performing object state encoding on the first deep feature, a first bounding box of the first frame image with respect to the object, the auxiliary deep feature, and an auxiliary bounding box of the auxiliary frame image with respect to the object; obtaining a current frame encoding vector by performing encoding on the current deep feature; generate a hidden feature using a trained transformer model provided an input based on the object state encoding vector and the current frame encoding vector to thus; and generating the short-term filter by linearly transforming the hidden feature, wherein the first search region may be determined according to the first bounding box, the auxiliary search region may be determined according to the auxiliary bounding box, and the current search region may be determined according to a predicted bounding box of a predicted object based on N number of frame images prior to the current frame image, wherein N is an integer greater than or equal to 1.

The method may further include, prior to the generating of the mixed filter, in response to the current frame image being determined to be an image frame at a predetermined position in the video sequence, generating the long-term filter by optimizing the previously obtained long-term filter based on the object template feature pool; or in response to the current frame image being determined to not be an image frame at the predetermined position in the video sequence, generating the previously obtained long-term filter as the long-term filter.

The optimizing of the previously obtained long-term filter may include extracting a predetermined number of deep features and bounding boxes of the object corresponding to respective ones of accumulated deep features from the object template feature pool and determining the extracted deep features and bounding boxes to be a filter training set; and training and/or optimizing, based on the filter training set, the previously obtained long-term filter through a filter optimization algorithm.

The generating of the mixed filter by fusing the short-term filter with the long-term filter may include generating a short-term object positioning response map and a long-term object positioning response map by respectively performing correlation processing on the current frame image using the short-term filter and the long-term filter; and generating the mixed filter by fusing the short-term filter with the long-term filter according to the short-term object positioning response map and the long-term object positioning response map.

The generating of the mixed filter may further include evaluating short-term map quality of the short-term object positioning response map, and long-term map quality of the long-term object positioning response map; determining a mixture weight of the short-term filter and a mixture weight of the long-term filter according to a result of comparing a second predetermined threshold value to the short-term map quality and the long-term map quality; and generating the mixed filter by fusing the short-term filter with the long-term filter according to the mixture weight of the short-term filter and the mixture weight of the long-term filter.

The determining of the mixture weight of the short-term filter and the mixture weight of the long-term filter may include, in response to the short-term map quality being determined greater than or equal to the second predetermined threshold value and the long-term map quality is less than the second predetermined threshold value, setting the mixture weight of the short-term filter as 1 and the mixture weight of the long-term filter as 0; in response to the short-term map quality being determined less than the second predetermined threshold value and the long-term map quality is greater than or equal to the second predetermined threshold value, setting the mixture weight of the short-term filter as 0 and the mixture weight of the long-term filter as 1; in response to both the mixture weights of the short-term filter and the long-term map being determined to have respective qualities that are less than the second predetermined threshold value, setting each of the mixture weights as a weight value corresponding to a previously obtained mixed filter; or in response to both the mixture weights of the short-term filter and the long-term map being determined to have respective qualities that are greater than or equal to the second predetermined threshold value, setting each of the mixture weights as a mixture weight of a normalized output of a Softmax activation function of the short-term map quality and the long-term map quality.

The generating of the mixed filter may further include generating a mixture weight of the short-term filter and a mixture weight of the long-term filter by using a convolutional neural network and a normalization function, according to the short-term object positioning response map and the long-term object positioning response map; and generating the mixed filter by fusing the short-term filter with the long-term filter according to the mixture weight of the short-term filter and the mixture weight of the long-term filter.

The generating of the mixture weight of the short-term filter and the mixture weight of the long-term filter may further include generating a mixed response map by mixing and processing the short-term object positioning response map and the long-term object positioning response map; extracting a feature from the mixed response map using the convolutional neural network, and generating a mixture weight vector by linearly transforming the extracted feature using a linear transformation layer; and generating the mixture weight of the short-term filter and the mixture weight of the long-term filter by normalizing the mixture weight vector according to a Softmax activation function.

The performing of the object tracking may further include generating, using the mixed filter, an object positioning response map by performing correlation processing on a current deep feature of an object search region of the current frame image; predicting an initial target object bounding box of the current frame image based on the object positioning response map; and segmenting a target object by using a segmentation network based on the initial target object bounding box and generating a target object segmentation map of the target object and a bounding box of a final target object, wherein the object search region of the current frame image is determined according to a bounding box of a predicted target object based on N number (N is an integer greater than or equal to 1) of frame images prior to the current frame image.

The object template feature pool may include accumulated deep features including at least a deep feature of an object search region of the current frame image; a plurality of deep features obtained by performing multi-augmentation processing on an object search region of a first frame image of the video sequence to obtain a plurality of augmented images and extracting features with respect to the plurality of augmented images; and/or a deep feature of an image frame having a determined greater tracking success confidence than a first predetermined threshold value when object tracking is performed on an image frame prior to the current frame image in the video sequence.

In another general aspect, examples include a non-transitory computer-readable storage medium storing instructions that, when executed by one or more processors, cause the one or more processors to perform the methods described herein.

In another general aspect, a computing apparatus includes one or more processors configured to execute instructions; and one or more memories storing the instructions, wherein the execution of the instructions by the one or more processors configures the one or more processors to control: a mixed filter generator to generate a mixed filter by fusing a short-term filter with a long-term filter; and an object tracker to perform object tracking on a current frame image based on the mixed filter, wherein the short-term filter is dependent on a prediction of the current frame image in a video sequence, and the long-term filter is a previously obtained long-term filter or is obtained by optimizing the previously obtained long-term filter based on an object template feature pool.

The one or more processors may be configured to further control a short-term filter generator to predict the short-term filter based on a first frame image of the video sequence, the current frame image and an auxiliary frame image of the video sequence, wherein the auxiliary frame image is an image frame that has a determined greater tracking success confidence than a first threshold value and is closest to the current frame image in time sequence.

The one or more processors may be configured to further control a long-term filter generator, in response to the current frame image being determined to be an image frame at a predetermined position in the video sequence to generate the long-term filter by optimizing the previously obtained long-term filter based on the object template feature pool, or in response to the current frame image being determined to not be an image frame at the predetermined position in the video sequence, to generate the previously obtained long-term filter as the long-term filter.

The mixed filter generator may be configured to generate a short-term object positioning response map and a long-term object positioning response map by respectively performing correlation processing on the current frame image, using the short-term filter and the long-term filter; and generate the mixed filter by fusing the short-term filter with the long-term filter according to the short-term object positioning response map and the long-term object positioning response map.

The mixed filter generator may be further configured to evaluate short-term map quality of the short-term object positioning response map, and long-term map quality of the long-term object positioning response map; determine a mixture weight of the short-term filter and a mixture weight of the long-term filter according to a result of comparing a second predetermined threshold value to the short-term map quality and the long-term map quality; and generate the mixed filter by fusing the short-term filter with the long-term filter according to the mixture weight of the short-term filter and the mixture weight of the long-term filter.

The mixed filter generator may be further configured to generate a mixture weight of the short-term filter and a mixture weight of the long-term filter by using a convolutional neural network and a normalization function, according to the short-term object positioning response map and the long-term object positioning response map; and generate the mixed filter by fusing the short-term filter with the long-term filter according to the mixture weight of the short-term filter and the mixture weight of the long-term filter.

The object tracker may include an object positioning response map generator configured to obtain, using the mixed filter, an object positioning response map by performing correlation processing on a current deep feature of an object search region of the current frame image; an initial target object bounding box predictor configured to predict an initial target object bounding box of the current frame image based on the object positioning response map; and a final target object bounding box predictor configured to segment a target object by using a segmentation network based on the initial target object bounding box and generating a target object segmentation map of the target object and a bounding box of a final target object, wherein the object search region of the current frame image is determined according to a bounding box of a predicted target object based on N number (N is an integer greater than or equal to 1) of frame images prior to the current frame image.

Other features and aspects will be apparent from the following detailed description, the drawings, and the claims.

Figure 1:
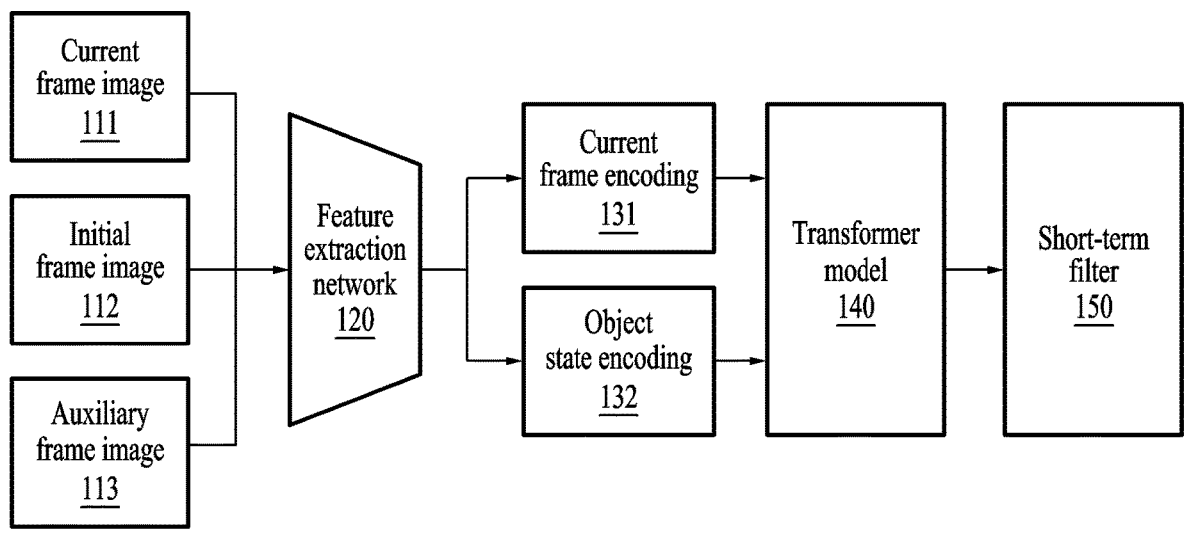
FIG. 1 illustrates an example typical apparatus with object tracking based on transduction.

Throughout the drawings and the detailed description, unless otherwise described or provided, the same drawing reference numerals may be understood to refer to the same or like elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known after an understanding of the disclosure of this application may be omitted for increased clarity and conciseness.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application. The use of the term "may" herein with respect to an example or embodiment, e.g., as to what an example or embodiment may include or implement, means that at least one example or embodiment exists where such a feature is included or implemented, while all examples are not limited thereto.

The terminology used herein is for describing various examples only and is not to be used to limit the disclosure. The articles "a," "an," and "the" are intended to include the plural forms as well, unless the context clearly indicates otherwise. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof, or the alternate presence of an alternative stated features, numbers, operations, members, elements, and/or combinations thereof. Additionally, while one embodiment may set forth such terms "comprise" or "comprises," "include" or "includes," and "have" or "has" specify the presence of stated features, numbers, operations, members, elements, and/or combinations thereof, other embodiments may exist where one or more of the stated features, numbers, operations, members, elements, and/or combinations thereof are not present.

As used herein, the term "and/or" includes any one and any combination of any two or more of the associated listed items. The phrases "at least one of A, B, and C", "at least one of A, B, or C", and the like are intended to have disjunctive meanings, and these phrases "at least one of A, B, and C", "at least one of A, B, or C", and the like also include examples where there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

Throughout the specification, when a component or element is described as being "connected to," "coupled to," or "joined to" another component or element, it may be directly "connected to," "coupled to," or "joined to" the other component or element, or there may reasonably be one or more other components or elements intervening therebetween. When a component or element is described as being "directly connected to," "directly coupled to," or "directly joined to" another component or element, there can be no other elements intervening therebetween. Likewise, expressions, for example, "between" and "immediately between" and "adjacent to" and "immediately adjacent to" may also be construed as described in the foregoing. It is to be understood that if a component (e.g., a first component) is referred to, with or without the term "operatively" or "communicatively," as "coupled with," "coupled to," "connected with," or "connected to" another component (e.g., a second component), it means that the component may be coupled with the other component directly (e.g., by wire), wirelessly, or via a third component.

Although terms such as "first," "second," and "third", or A, B, (a), (b), and the like may be used herein to describe various members, components, regions, layers, or sections, these members, components, regions, layers, or sections are not to be limited by these terms. Each of these terminologies is not used to define an essence, order, or sequence of corresponding members, components, regions, layers, or sections, for example, but used merely to distinguish the corresponding members, components, regions, layers, or sections from other members, components, regions, layers, or sections. Thus, a first member, component, region, layer, or section referred to in the examples described herein may also be referred to as a second member, component, region, layer, or section without departing from the teachings of the examples.

Unless otherwise defined, all terms, including technical and scientific terms, used herein have the same meaning as commonly understood by one of ordinary skill in the art to which this disclosure pertains and based on an understanding of the disclosure of the present application. Terms, such as those defined in commonly used dictionaries, are to be interpreted as having a meaning that is consistent with their meaning in the context of the relevant art and the disclosure of the present application and are not to be interpreted in an idealized or overly formal sense unless expressly so defined herein.

In object tracking, feature representation of an object may be a key factor influencing the total performance of a tracking system. Existing object tracking methods typically use a hand-crafted feature and a deep feature. The hand-crafted feature may generally include Histogram of Oriented Gradients (HOG), a Scale Invariant Feature (SIFT), and a Grayscale feature. The deep feature may be obtained by using a convolution neural network (CNN) that may train and learn a large number of samples through a parameter model and have greater distinguishability and robustness than the hand-crafted feature.

The object tracking methods may be categorized into object tracking based on offline transductive learning and object tracking based on online inductive learning. However, such two existing methods may have certain limitations. For example, since the existing object tracking method based on offline transductive learning may depend on the accuracy of an auxiliary frame, a large error in selecting the auxiliary frame may greatly impact the performance of a tracker. Therefore, such an existing tracking method may not be so stable. In another example, since the existing object tracking method based on online inductive learning performs an online update at time intervals in order to train/optimize filter parameters, such an existing object tracking method may not successfully process a sudden deformation of an object in a tracking process. Also, in existing object tracking technology, a user may display a target object in the form of a bounding box on a first frame image. In the bounding box, the target object may be maximally covered and the background may be minimally covered. Then, in a subsequent video frame, an object tracking algorithm may need to provide position information of the target object and the bounding box. An existing approach is to change the form of an object tracking display into a segmentation mask of the target object and to minutely display the target object at a pixel level to distinguish the target object from the background. Therefore, in the subsequent video frame, an object tracking algorithm may provide the segmentation mask along with the position information of the target object. Compared to existing bounding box tracking technology, the existing mask tracking or the existing dense track may have much in common with video object segmentation. In addition to the existing bounding box tracking technology, the existing dense tracking may generally provide an additional segmentation branch, integrate with object segmentation technology, and output the central position of an object and the segmentation mask of the object at the same time.

Nonetheless, as the target object of the object tracking technology may be a general object, such as a moving person, an animal, or a vehicle (e.g., a car, an aircraft, or the like), common difficulties of the existing object tracking technology may include but be not limited to:

1) Scale conversion: as a video sequence progresses, the scale conversion of an object increases. Here, a large-scale conversion may greatly impact accuracy in the output of a bounding box. A rediscovery detector may not know the size scale of a lost target object and may need to detect the lost target object within a certain scale range.

2) Background interference: in the background, there may be an object, texture (a non-object), or a shape that is similar (visually) to an object being tracked. Some researchers refer to an interfering object as a distractor.

3) Lighting change: change in the intensity of light received by a target object may greatly change visual features of an extracted object. When template lighting of an image in a first frame image differs greatly from lighting of an object in a subsequent video frame, the difficulty of tracking the object may increase.

4) In-plane rotation and out-of-plane rotation: similar to the lighting change, rotation may also cause differences in features of an object. In particular, out-of-plane rotation may show a different surface of a three-dimensional object in the field of vision and introduce a new visual feature with a previous visual feature disappearing, and accordingly, the difficulty in tracking an object may increase.

5) Deformation: similar to the lighting change and the rotation, deformation of a non-rigid object may also change features of an object, resulting in increased difficulty in visual tracking.

In order to overcome such issues described above, a typical object tracking method based on the filter technology and the deep feature may be categorized into object tracking based on offline transductive learning and object tracking based on online inductive learning.

FIG. 1 illustrates an example typical apparatus with object tracking based on transduction. The typical apparatus may include an input portion, a feature extraction network 120, a current frame encoding 131, an object state encoding 132, a transformer model 140, and a filter 150.

Referring to FIG. 1, the input portion of the typical apparatus based on transductive learning may be formed as two parts. One part of the input portion may be configured to provide an initial frame image 112 (e.g., a first frame image) of object state information, an auxiliary frame image 113 of object state information, and bounding boxes of a target object corresponding to the initial frame image 112 and the auxiliary frame image 113. The auxiliary frame image 113 may be closest to a current frame image 111 in time order of a video sequence in an object tracking process and may be a previous confidence image frame having a greater response value of a response map than a predetermined threshold value. The other part of the input portion may be configured to provide the current frame image 111 of the video sequence. That is, the current frame image 111 may need to predict the position of the target object.

The feature extraction network 120 may be configured to extract deep features from each of the initial frame image 112, the auxiliary frame image 113, and the current frame image 111. In this case, in a process of extracting the deep features, the feature extraction network 120 may extract deep features only from an object search region determined according to the bounding box of the target object. Specifically, the feature extraction network 120 may extract deep features from an object search region determined according to the bounding box of the target object of the initial frame image 112, an object search region determined according to the bounding box of the target object of the auxiliary frame image 113, and an object search region determined according to the bounding box of the target object predicted by the current frame image 111. The bounding box of the target object predicted by the current frame image 111 may be predicted according to a trained CNN or a rule for presetting the bounding boxes of the target object of previous N number frame images (N is an integer greater than or equal to 1) of the current frame image 111. For example, the bounding box of the target object predicted by the current frame image 111 may be predicted according to the bounding boxes of the target object of previous frame images.

Then, the object state encoding 132 may be performed on the deep feature of the initial frame image 112, the deep feature of the auxiliary frame image 113, and the bounding boxes of the target object and thus generate an object state encoding vector. At the same time, the current frame encoding 131 may be performed on the deep feature of the current frame image 111 and thus generate a current frame encoding vector. Then, the transformer model 140 based on an attention mechanism may be used to encode and decode the object state encoding vector and the current frame encoding vector, thereby generating/obtaining a hidden feature, and may be used to linearly transform the hidden feature to the filter 150 suitable for a current scene. In this case, the hidden feature may be an output of an intermediate layer (also, referred to as a hidden layer) of the transformer model 140 and may be generally an output of a last hidden layer.

Thereafter, the filter 150 may be used to perform correlation processing on the current frame encoding vector, thereby generating/obtaining an object positioning response map. A position with the greatest response in the object positioning response map may be the position of a predicted target object.

Thus, the typical apparatus based on transductive learning may obtain a filter by mining the features of a closest confidence frame and an initial frame image through an offline trained network and directly predicting filter parameters. Since such a method relies on an auxiliary frame within a short period of time, a generated filter may include only short-term object information, and accordingly, the filter 150 may be referred to as a short-term filter 150.

Figure 2:
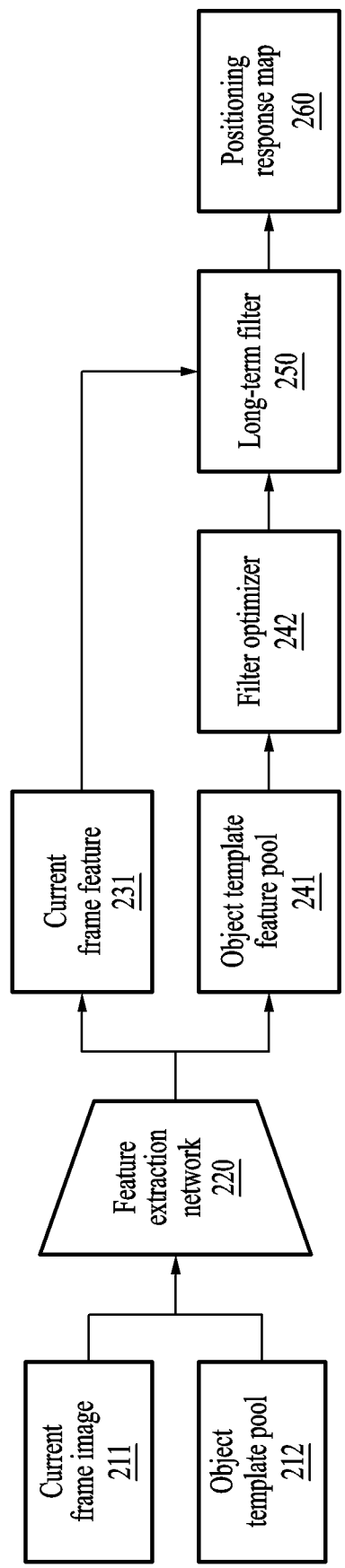
FIG. 2 illustrates an example typical apparatus with object tracking based on inductive learning.

FIG. 2 illustrates an example typical apparatus with object tracking based on inductive learning. The typical apparatus may include an input portion, a feature extraction network 220, a current frame feature 231, an object template feature pool 241, a filter optimizer 242, a filter 250, and a positioning response map 260.

Referring to FIG. 2, the input portion of the typical apparatus based on online inductive learning may be formed as two parts. In this case, one part of the input portion may be an object template pool 212 that may be configured to store confidence image frames having a greater response value of a response map than a predetermined threshold value. The other part of the input portion may be a current frame image 211 of a video sequence. That is, the current frame image 211 may need to predict the position of a target object.

The feature extraction network 220 may be configured to extract both the deep features of the current frame image 211 and the confidence image frames of the object template pool 212 and then may obtain the deep feature of the current frame image 211 and the deep feature of each confidence image frame of the object template pool 212. The respective deep features of each image frame of the object template pool 212 may be included in an object template feature pool 241. Similar to the process of extracting the deep features described with respect to FIG. 1, the feature extraction network 220 may be configured to extract a deep feature only for an object search region determined according to the bounding box of a target object. For example, the deep feature may be extracted from an object search region determined according to the bounding box of the target object of each image frame of the object template pool 212 and an object search region determined according to the bounding box of a predicted target object of the current frame image 211.

Then, in the typical apparatus, the deep features extracted (e.g., randomly extracted or extracted according to a predetermined extraction method) from the object template feature pool 241 may be input to the filter optimizer 242 (hereinafter, the filter optimizer 242 may correspond to a long-term filter generator 850 described with reference to FIG. 8) as a filter online training/optimization training set. The filter optimizer 242 may be efficiently and quickly trained from the training set, for example, through a conjugate gradient and a Gauss-Newton algorithm and may generate a filter including long-term object information, that is, the long-term filter 250, through the training. Then, the typical apparatus may use the long-term filter 250 in a time domain or a Fourier domain to thus generate a positioning response map 260 of the object by performing correlating processing on the current frame feature. A position having the greatest response in the positioning response map 260 may be a predicted position of the target object. In summary, the typical apparatus based on the inductive learning may take a tracking result collected during the tracking process as a training set and continuously train/optimize filter parameters online, thereby obtaining the long-term filter 250.

However, the typical transductive learning-based apparatus and the typical online inductive learning-based apparatus may have limitations to obtaining a filter.

For example, the typical transductive learning-based apparatus may represent an object state based on features of an initial frame and an auxiliary frame during filter prediction and may then fuse the object state with a current feature based on a transformer model, thereby obtaining a filter to be used for tracking. Although such a method has great discrimination and more greatly discriminates a target object from an interferer, a huge error in selecting an auxiliary frame may greatly impact the performance of a tracker since the method relies on the accuracy of an auxiliary frame. Therefore, this type of tracker may not be stable.

In another example, the typical apparatus based on online inductive learning may use more object template features to represent an object than the object tracking apparatus based on transductive learning, thereby alleviating performance degradation triggered by an error in tracking a specific frame, and thus, the typical apparatus may have greater robustness but less discrimination than the typical apparatus based on transductive learning. In addition, since the typical apparatus based on online inductive learning employs an online updating method at intervals to train/optimize filter parameters, the typical apparatus may not properly handle rapid object deformation during a tracking process.

Therefore, it is found herein to be beneficial to provide a high-precision dense object tracking method based on filter technology and deep features under a two-branch framework of transductive learning and inductive learning. In the two-branch framework, one branch may use online inductive learning to optimize a long-term filter, the other branch may use transductive learning to predict a short-term filter, and the two obtained filters may be fused. The two-branch framework may avoid performance degradation caused by a certain frame tracking error and also improve the performance of the discrimination of a tracker.

Hereinafter, an example method and computing apparatus with object tracking, according to various embodiments, are described with reference to FIGS. 3 through 9. As will be described in detailed with respect to FIGS. 8 and 9, a computing apparatus may include at least one or more processors configured to execute instructions and one or more memories storing the instructions, and the execution of the instructions by the one or more processors may configure the computing apparatus to perform any one or any combination of operations or methods described herein. Thus, example methods may be processor-implemented methods.

Figure 3:
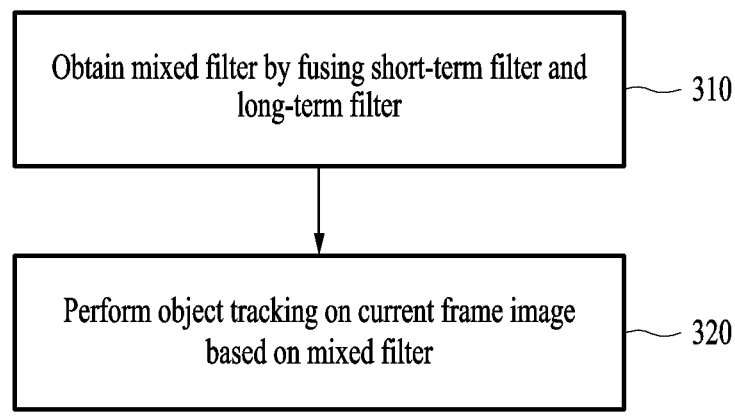
FIG. 3 illustrates an example method with object tracking according to one or more embodiments.

FIG. 3 illustrates an example method with object tracking according to one or more embodiments. The method may include operations 310 and 320 as a non-limiting example.

Figure 4:
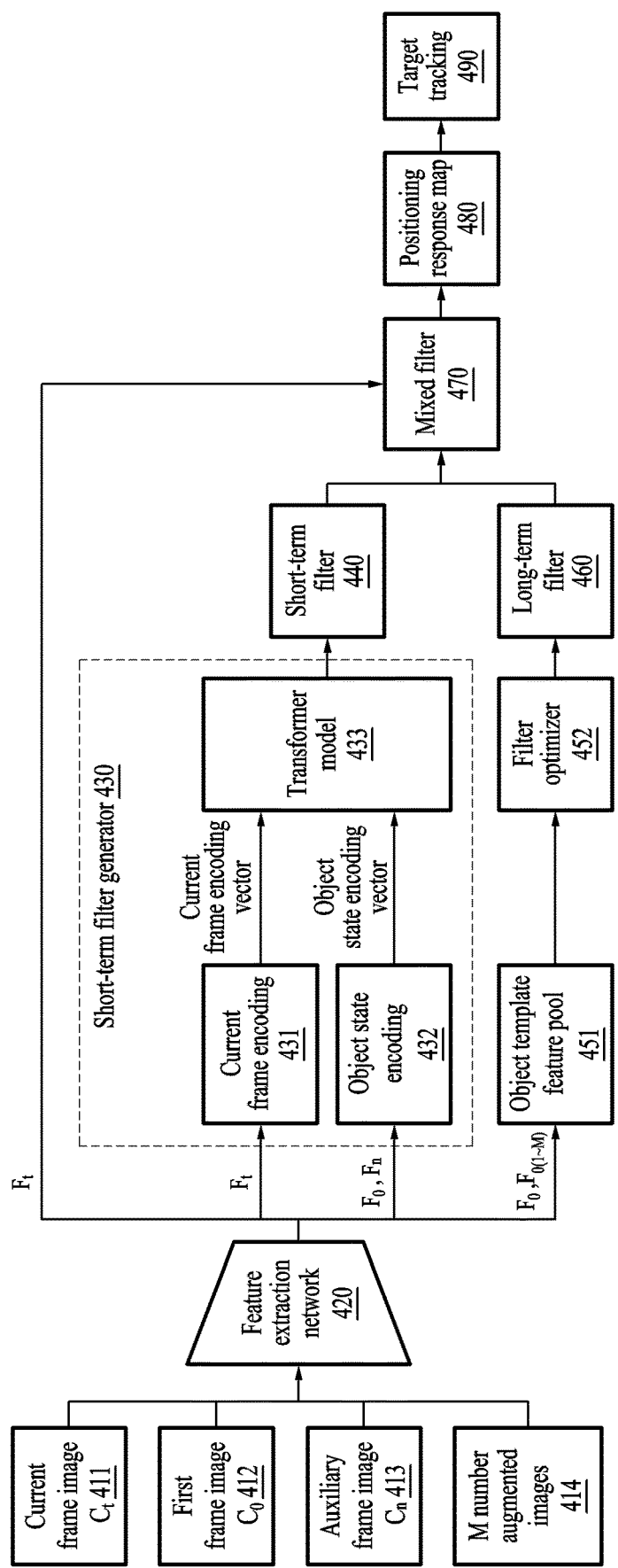
FIG. 4 illustrates an example tracking framework according to one or more embodiments.

Referring to FIG. 3, in operation 310, an example method with object tracking may obtain a mixed filter by fusing a short-term filter 440 (in FIG. 4) and a long-term filter 460 (in FIG. 4). In operation 320, the example method may perform object tracking on a current frame image 411 based on the mixed filter.

FIG. 4 illustrates an example object tracking framework. In the example object tracking framework, the short-term filter 440 may be generated based on the prediction of a current frame image 411 in a video sequence. The prediction of the short-term filter 440 may include predicting the short-term filter 440 based on a first frame image 412, the current frame image 411, and an auxiliary frame image 413 of the video sequence and obtaining the short-term filter $f_{st}$ 440 corresponding to the current frame image 411. As a non-limiting example, the short-term filter $f_{st}$ 440 may be predicted based on offline transductive learning.

Referring to FIG. 4, an example method with object tracking may first obtain a first frame image 412, a current frame image 411, and an auxiliary frame image 413 of a video sequence. Among them, the auxiliary frame image 413 may have a greater tracking success confidence than a first predetermined threshold value and may be closest to a current frame in time order of the video sequence. For example, in object tracking for each frame in the video sequence, when a response map of an object search region generated by a specific frame image prior to the current frame image 411 has a greater response value than the first predetermined threshold value and the specific frame image is closest to the current frame in time order of the video sequence, the specific frame image may be set as the auxiliary frame image 413.

A feature extraction network 420 may be configured to extract respective features with respect to a first search region $C_0$ that is the object search region of the first frame image 412, an auxiliary search region $C_n$ that is the object search region of the auxiliary frame image 413, and a current search region $C_t$ that is the object search region of the current frame image 411. Thereafter, the feature extraction network 420 may generate a first deep feature $F_O$ that is the deep feature of the first search region $C_0$, an auxiliary deep feature $F_n$ that is the deep feature of the auxiliary search region $C_n$, and a current deep feature $F_t$ that is the deep feature of the current search region $C_t$. As non-limiting examples, the feature extraction network 420 may be configured to sequentially extract the respective features for the first search region $C_0$, the auxiliary search region $C_n$, and the current search region $C_t$. Also, the feature extraction network 420 may be used in plurality to simultaneously extract the respective features of the first search region $C_0$, the auxiliary search region $C_n$, and the current search region $C_t$. The feature extraction network 420 may be a CNN or a recurrent neural network (RNN) but is not limited thereto.

The first search region $C_0$ may be determined according to a first bounding box $b_O$ that is the bounding box of an object of the first frame image 412. For example, the first bounding box $b_O$ may be provided by a user. The auxiliary search region $C_n$ may be determined according to an auxiliary bounding box $b_n$ that is the bounding box of an object of the auxiliary frame image 413. The current search region $C_t$ may be determined according to a predicted bounding box by that is the bounding box of a predicted object based on a frame image prior to the current frame image 411. Specifically, the object tracking method may determine the predicted bounding box $b_p$ according to the bounding box of the target object in a frame image prior to the current frame image 411 and then perform clipping on the current image frame 411 according to the predicted bounding box $b_p$ to obtain the current search region $C_t$.

As shown in FIG. 4, a short-term filter generator 430 (corresponding to a short-term filter generator 830 described below with reference to FIG. 8) may be configured to perform object state encoding 432 on the first deep feature $F_O$, the first bounding box $b_O$, the auxiliary deep feature $F_n$, and the auxiliary bounding box $b_n$, thereby obtaining an object state encoding vector. At the same time, the short-term filter generator 430 may be configured to perform current frame encoding 431 on the current deep feature $F_t$ that is the deep feature of the current search region $C_t$, thereby obtaining a current frame encoding vector.

Thereafter, as shown in FIG. 4, the object state encoding vector and the current frame encoding vector may be input to a transformer model 433, which is trained offline, in the short-term filter generator 430. The transform model 433 is configured to perform a process (i.e., first encoding and then decoding) to generate a hidden feature (i.e., a hidden feature vector). Here, the hidden feature may be an output of an intermediate layer (that is, a hidden layer) of the transformer model 433 and may be generally an output of a last hidden layer of the transformer model 433. Then, the short-term filter generator 430 may linearly transform the hidden feature through a linear transformation layer (not shown) to generate a short-term filter $f_{st}$ 440. That is, the short-term filter generator 430 may be configured to generate the short-term filter $f_{st}$ 440 that is suitable for the current scene by fusing spatial-temporal information. As a non-limiting example, the process of obtaining the short-term filter $f_{st}$ 440 may be similar to that of FIG. 1.

The object tracking method of FIG. 4 may mine/generate the features of the nearest reliable tracking frame (i.e., the auxiliary frame image 413) and the first frame image 412 through a network trained offline and may directly predict short-term filter parameters to generate a feature representation for an object short-term state, which is advantageous for tracking with accurate discrimination.

The description above is about a method of predicting the short-term filter $f_{st}$ 440, and a method of obtaining a long-term filter $f_{lt}$ is described below.

In an example, before operation 310, the long-term filter $f_{lt}$ 460 may need to be determined for the fusion process of operation 310. The long-term filter $f_{lt}$ 460 may be a previously obtained long-term filter or may be obtained by optimizing the previously obtained long-term filter based on an object template feature pool 451.

Specifically, when the current frame image 411 is not an image frame at a predetermined position in a video sequence, a long-term filter used in the fusion process of operation 310 may be a previously generated long-term filter. In this case, a long-term filter generated for a previous frame image and an initial long-term filter for the first frame image 412 of the video sequence may be the previously generated long-term filter. In addition, the predetermined position may be, for example, an image frame position at every 10 frames in the video sequence but is not limited thereto.

When the current frame image 411 is an image frame at the predetermined position in the video sequence, the long-term filter $f_{lt}$ 460 used in the fusion process of operation 310 may be a long-term filter generated by optimizing the previously generated long-term filter based on the object template feature pool 451. That is, a long-term filter generated each time may be used for at least one image frame. Hereinafter, the process of optimizing the long-term filter is described with reference to FIG. 4. In an example, the long-term filter $f_{lt}$ 460 corresponding to the current frame image 411 may be generated by optimizing the previously generated long-term filter based on online inductive learning. This will be further described below with reference to FIG. 4.

As shown in FIG. 4, the object tracking method may first extract a predetermined number of deep features and bounding boxes of objects corresponding to respective ones of accumulated deep features from the object template feature pool 451 and determine the extracted deep features and bounding boxes as a filter training set.

As a non-limiting example, the accumulated deep features of the object template feature pool 451 may include: the deep feature of a current search region $C_t$ that is the object search region of the current frame image 411; a plurality of deep features obtained by performing multi-augmentation on a first search region $C_0$ that is the object search region of the first frame image 412 in the video sequence to obtain a plurality of augmented feature images 414 and by then extracting features for the plurality of augmented images 414; and/or the deep feature of an image frame having a greater success confidence than a first predetermined threshold value when object tracking is performed for an image frame prior to the current frame image 411 in the video sequence. The accumulated deep features of the object template feature pool 451 may be kept updating during a process of tracking a target object according to the object tracking methods described herein.

Specifically, the object tracking method may first add the first deep feature $F_O$, which is the deep feature of the first search region $C_0$, to the object template feature pool 451. In addition, the first search region $C_0$ described above in operation 310 may be augmented M number of times. For example, augmentation, such as rotation, lifting, flipping, and translation, may be performed on the first search region $C_0$ to obtain M number of augmented images 414. Then, the object tracking method may extract the deep features of the M number augmented images 414 using the feature extraction network 420 (e.g., a CNN). In addition, in the process of tracking the object in the video sequence according to the object tracking method, the object template feature pool 451 may be updated based on an image frame having a greater tracking success confidence than the first predetermined threshold value. For example, in the object tracking performed for each frame of the video sequence, when a response map of an object search region generated by a certain frame image has a greater response value than the first predetermined threshold value, the deep feature of the object search region of the certain frame image may be added to the object template feature pool 451 for the update of the object template feature pool 451.

Then, as shown in FIG. 4, the object tracking method may train and/or optimize the previously generated long-term filter based on the filter training set through a filter optimization algorithm of a filter optimizer 452, thereby generating/obtaining the long-term filter $F_{lt}$ 460.

In an example, based on the filter training set, a long-term filter $F_{lt}$ 460 may be generated by efficient and quick training and/or optimization using a conjugate gradient and a Gauss-Newton algorithm. As a non-limiting example, the process of generating/obtaining the long-term filter $f_{lt}$ 460 above may be similar to the one described with reference to FIG. 2. Similarly, the object tracking method may take a tracking result collected in the object tracking process as a training set and generate a feature representation for long-term tracking of the target object by continuously updating the object template feature pool 451 and training/optimizing filter parameters online, such that the feature representation may have great robustness and stability.

The description of the example method of obtaining the long-term filter $f_{lt}$ 460 has been provided above. Hereinafter, an example process of obtaining a mixed filter 470 by fusing the short-term filter $f_{st}$ 440 with the long-term filter $f_{lt}$ 460 is described.

As a non-limiting example, obtaining the mixed filter 470 by fusing the short-term filter $f_{st}$ 440 with the long-term filter $f_{lt}$ 460 may include performing correlation processing on the current frame image 411 by using the short-term filter $f_{st}$ 440 and the long-term filter $f_{lt}$ 460, thereby generating/obtaining a short-term object positioning response map and a long-term object positioning response map, respectively, and then generating/obtaining the mixed filter 470 by fusing the short-term filter $f_{st}$ 440 with the long-term filter $f_{lt}$ 460 according to the short-term object positioning response map and the long-term object positioning response map.

Figure 5:
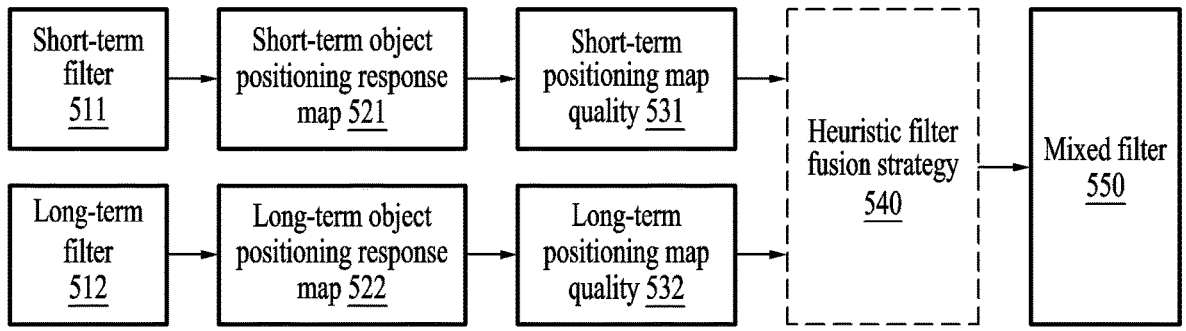
FIG. 5 illustrates an example heuristic fusion process of a short-term filter and a long-term filter according to one or more embodiments.

FIG. 5 illustrates an example heuristic fusion process of a short-term filter and a long-term filter according to one or more embodiments.

Referring to FIG. 5, an example method with object tracking may perform correlation processing on an object search region of a current frame image by both using a short-term filter 511 and a long-term filter 512. That is, the object tracking method may obtain a short-term object positioning response map 521 and a long-term object positioning response map 522, respectively.

Then, the example object tracking method may evaluate short-term positioning map quality $Q_{st}$ 531 of the short-term object positioning response map 521 and long-term positioning map quality $Q_{lt}$ 532 of the long-term object positioning response map 522. For example, the object tracking method may use an Average Peak Correlation Energy (APCE) algorithm for the evaluating, as shown in Equation 1 below.

Equation 1

$$Q = \frac{|S_{max} - S_{min}|}{\text{mean}\left(\sum_{w,h}(S_{w,h} - S_{min})^2\right)}$$

In Equation 1, $S_{max}$, $S_{min}$ and $S_{w,h}$ may denote a maximum response value of a positioning response map, a minimum response value of the positioning response map, a response value at (h, w) in the positioning response map, respectively. A mean( ) function may be used to calculate an average value and Q may denote positioning response map quality.

When the short-term positioning map quality $Q_{st}$ 531 of the short-term object positioning response map 521 is evaluated, $S_{max}$, $S_{min}$, and $S_{w,h}$ of Equation 1 may denote a maximum response value of the short-term object positioning response map 521, a minimum response value of the short-term object positioning response map 521, and a response value at the position (h, w) in the short-term object positioning response map 521, respectively. Similarly, when the long-term positioning map quality $Q_{lt}$ 532 of the long-term object positioning response map 522 is evaluated, $S_{max}$, $S_{min}$, and $S_{w,h}$ may denote a maximum response value of the long-term object positioning response map 522, a minimum response value of the long-term object positioning response map 522, and a response value at the position (h,w) in the long-term object positioning response map 522, respectively.

Then, the example object tracking method may determine a mixture weight $W_{st}$ of the short-term filter fst 511 and a mixture weight $W_{lt}$ of the long-term filter flt 512 according to a result of comparing a second predetermined threshold value to the short-term positioning map quality $Q_{st}$ 531 and the long-term positioning map quality $Q_{lt}$ 532.

For example, when the short-term positioning map quality $Q_{st}$ 531 is greater than or equal to the second predetermined threshold value and the long-term positioning map quality $Q_{lt}$ 532 is less than the second predetermined threshold value, the object tracking method may set the mixture weight $w_{st}$ of the short-term filter 511 as 1 and the mixture weight $w_{lt}$ of the long-term filter 512 as 0, in which case a mixed filter 550 may be substantially the same as the short-term filter 511.

When the short-term positioning map quality $Q_{st}$ 531 is less than the second predetermined threshold value and the long-term positioning map quality $Q_{lt}$ 532 is greater than or equal to the second predetermined threshold value, the object tracking method may set the mixture weight $w_{st}$ of the short-term filter 511 as 0 and the mixture weight $w_{lt}$ of the long-term filter 512 as 1, in which case the mixed filter 550 may be substantially the same as the long-term filter 512.

When both the short-term positioning map quality $Q_{st}$ 531 and the long-term positioning map quality $Q_{lt}$ 532 are less than the second predetermined threshold value, the mixture weight $w_{st}$ of the short-term filter 511 and the mixture weight $w_{lt}$ of the long-term filter 512 may be set as a weight corresponding to a mixed filter that has previously obtained the mixture weight $w_{st}$ of the short-term filter 511 and the mixture weight $w_{lt}$ of the long-term filter 512. For example, when the weights used for generating a previous mixed filter are $w_{st}'$ and $w_{lt}'$, the mixture weight $w_{st}$ of a current short-term filter and the mixture weight $w_{lt}$ of a current long-term filter may be set as $w_{st}'$ and $w_{lt}'$, respectively. In this case, the mixed filter 550 may be substantially the same as the previously generated mixed filter, such as a mixed filter applied to a previous frame image.

When both the short-term positioning map quality $Q_{st}$ 531 and the long-term positioning map quality $Q_{lt}$ 532 are greater or equal to the second predetermined threshold value, the object tracking method may set $w_{st}$ and $w_{lt}$ as mixture weights of a normalized output of a Sotfmax ($Q_{st}$, $Q_{lt}$) activation function.

Thereafter, the object tracking method may fuse the short-term filter 511 with the long-term filter 512 according to a heuristic filter fusion strategy 540, based on the mixture weight $w_{st}$ of the short-term filter 511 and the mixture weight $w_{lt}$ of the long-term filter 512, to thus generate the mixed filter 550. For example, the example object tracking method may perform a fusion operation according to Equation 2 below.

$$f = w_{st}*f_{st} + w_{lt}*f_{lt} \qquad \text{Equation 2:}$$

In Equation 2, f may denote a mixed filter, $f_{st}$ may denote a short-term filter, $w_{st}$ may denote a mixture weight of the short-term filter $f_{st}$, $f_{lt}$ may denote a long-term filter, and $w_{lt}$ may denote a mixture weight of the long-term filter $f_{lt}$.

The description of the process of obtaining the mixed filter 550 according to the heuristic fusion process of the short-term filter 511 and the long-term filter 512 has been provided above.

The heuristic fusion process described above may have a small number of parameters, no need to train a neural network model, a small amount of calculations in the entire fusion process, and small computing resources, and accordingly, the heuristic fusion process may provide a fast speed and be suitable for a mobile terminal.

Figure 6:
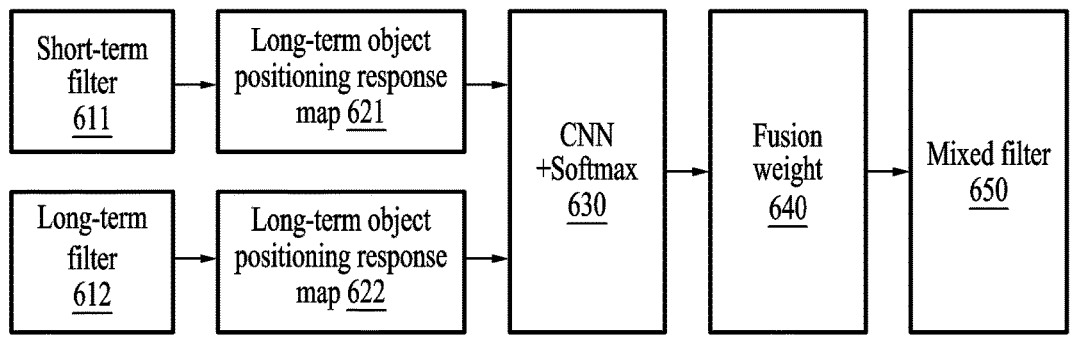
FIG. 6 illustrates an example training fusion process of a short-term filter and a long-term filter according to one or more embodiments.

FIG. 6 illustrates an example training fusion process of a short-term filter and a long-term filter according to one or more embodiments. In an example, the training fusion process may be the fusion process of the short-term filter 440 and the long-term filter 460 of FIG. 4.

Referring to FIG. 6, the example object tracking method may perform correlation processing on the object search region of a current frame image, using each of a short-term filter 611 and a long-term filter 612. That is, the example object tracking method may obtain a short-term object positioning response map 621 and a long-term object positioning response map 622. For example, the object tracking method may obtain the short-term object positioning response map 621 and the long-term object positioning response map 622 at dimension (1\*1\*W\*H).

Thereafter, the example object tracking method may use a CNN and a normalization function 630 to obtain a mixture weight $w_{st}$ of the short-term filter 611 and a mixture weight $w_{lt}$ of the long-term filter 612 according to the short-term object positioning response map 621 and the long-term object positioning response map 622.

As a non-limiting example, in the process of obtaining the mixture weight $w_{st}$ of the short-term filter 611 and the mixture weight $w_{lt}$ of the long-term filter 612 by using the CNN and the normalization function, the example object tracking method may obtain a mixed response map by fusing the short-term object positioning response map $S_{t\_St}$ with the long-term positioning response map $S_{t\_lt}$. For example, according to Equation 3 below, two positioning response maps may be fused to obtain a mixed response map of a (1\*1\*W\*H) dimension.

$$X_t = \text{Concat}(S_{t\_lt}, S_{t\_st}) \qquad \text{Equation 3:}$$

In Equation 3, $X_t$ may denote a mixed response map, $S_{t\_St}$ may denote a short-term object positioning response map, $S_{t\_lt}$ may denote a long-term object positioning response map, and Concat( ) may denote a function used to connect two input quantities.

After generating/obtaining the mixed response map $X_t$, a feature may be extracted from the mixed response map $X_t$ by using a CNN, and the extracted features may be linearly transformed to generate a mixture weight vector. Then, a fusion weight 640 may be generated by normalizing the mixture weight vector according to the Softmax activation function. In an example, the fusion weight 640 may include the mixture weight $w_{st}$ of the short-term filter 611 and the mixture weight $w_{lt}$ of the long-term filter 612. In addition, $w_{st}$ and $w_{lt}$ may be obtained through Equation 4 below.

$$w_{st}, w_{lt} = \text{Softmax}(MLP(\text{CNN}(X_t)))\qquad\text{Equation 4:}$$

In Equation 4, $X_t$ may denote a mixed response map, $w_{st}$ may denote the mixture weight of the short-term filter 611, $w_{lt}$ may denote the mixture weight of the long-term filter 612, CNN( ) may denote a CNN for feature extraction, MLP( ) may denote a function for linear transformation, and Softmax( ) may denote a normalization function.

Thereafter, the example object tracking method may fuse the short-term filter 611 with the long-term filter 612 according to the mixture weight $w_{st}$ of the short-term filter 611 and the mixture weight $w_{lt}$ of the long-term filter 612 and may thus generate a mixed filter 650. For example, the short-term filter 611 and the long-term filter 612 may be fused through Equation 2.

The description of the example process of obtaining the mixed filter 650 according to the learning fusion process of the short-term filter 611 and the long-term filter 612 has been provided above. The learning fusion process may more dynamically fuse the short-term filter 611 with the long-term filter 612 and may have great fusion performance.

A mixed filter generated by fusing a short-term filter with a long-term filter through either of the two methods may avoid performance degradation caused by an error in tracking a specific frame and improve the discrimination of a tracker and object-tracking performance.

Referring back to FIG. 3, in operation 320, the object tracking method may perform object tracking on the current frame image based on the mixed filter. Such a tracking based on a mixed filter is further described with reference to FIG. 8 below.

Figure 7:
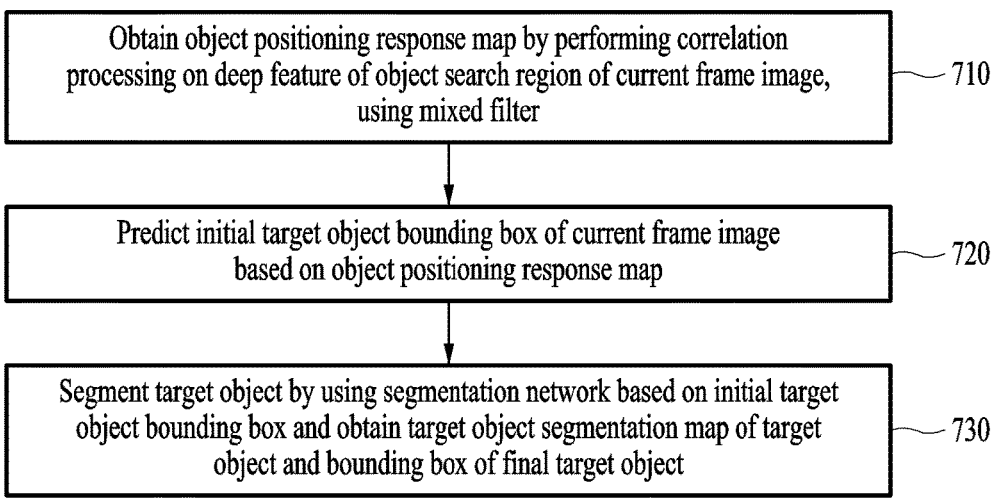
FIG. 7 illustrates an example object tracking process for a current frame image according to one or more embodiments.

FIG. 7 illustrates an example method with object tracking for a current frame image according to one or more embodiments. As a non-limiting example, the example method may include operations 710, 720 and 730, which may be performed by one or more processors of the computing apparatus that will be described with respect to FIGS. 8 and 9.

Referring to FIG. 7, in operation 710, the example object tracking method may generate an object positioning response map by performing correlation processing on a deep feature $F_t$ of an object search region $C_t$ of a current frame image, using a mixed filter. The object search region $C_t$ of the current frame image may be determined according to a bounding box by of a target object predicted based on N number frame images prior to the current frame image. In this case, N may be an integer greater than or equal to 1. The description thereof is given with respect to operation 310 and accordingly is not repeated herein.

In operation 720, the example object tracking method may predict an initial target object bounding box of the current frame image based on the object positioning response map.

In an example, the example object tracking method may generate a fused response map by fusing an object positioning response map with a classification response map obtained by a trained CNN. Then, the example object tracking method may predict the initial target object bounding box of the current frame image by using the fused response map.

For example, the CNN may adopt a TransT model which may predict and generate a classification response map Map_1 and a regression vector map Map_v according to the input current frame image and other images (e.g., the first frame image and the auxiliary frame image).

In this case, the example object tracking method may obtain a fusion positioning response map Map_2 by fusing the object positioning response map Map_0 with the classification response map Map_1 predicted by the TransT model. For example, the example object tracking method may obtain a fusion positioning response map (Map_2=Map_0*$w_0$+Map_1*$w_1$) by assigning weights to the object positioning response map Map_0 and the classification response map Map_1. In this case, $w_0$ and $w_1$ may represent weights of the object positioning response map Map_0 and the classification response map Map_1, respectively, and may be set according to empirical data. For example, each of $w_0$ and $w_1$ may be 0.5 but is not limited thereto.

After obtaining the fusion positioning response map Map_2, the example object tracking method may predict an initial target object bounding box of the current frame image according to the fusion positioning response map Map_2 and the regression vector map Map_v. For example, the example object tracking method may determine, to be a region of the target object, a region in which a response value is greater than a predetermined threshold value in the fusion positioning response map Map_2 and may generate the initial target object bounding box by using a vector corresponding to the region in the regression vector map Map_v. The classification response map and the regression vector map generated by the TransT model are used as non-limiting examples above to explain how to use the initial object positioning response map to predict the initial target object bounding box. All methods capable of implementing the prediction operation may be applied to the one or more embodiments described herein.

In operation 730, the example object tracking method may segment the target object by using a segmentation network based on the initial target object bounding box and may obtain a target object segmentation map of the target object and a bounding box of a final target object.

In an example, the segmentation network may be a CNN that is pre-trained by training data. I segmentation network may segment the target object according to the initial target object bounding box, using a model based on a Spatial-Time Memory Network (STM) mode, may generate a dense representation (i.e., the target object segmentation map) of the target object, and may generate a final target object bounding box by further segmenting the initial target object bounding box. As a non-limiting example, in the example object tracking method, a decoder of the STM mode-based model may adopt an Alpha-Refine model to obtain a segmented target object bounding box.

The example object tracking method may complete object tracking of the current frame image and thus generate the target object segmentation map of the target object and the final target object bounding box. Then, the example object tracking method may perform object tracking on the subsequent frame image of the current frame image in the same order starting from operation 310.

Figure 8:
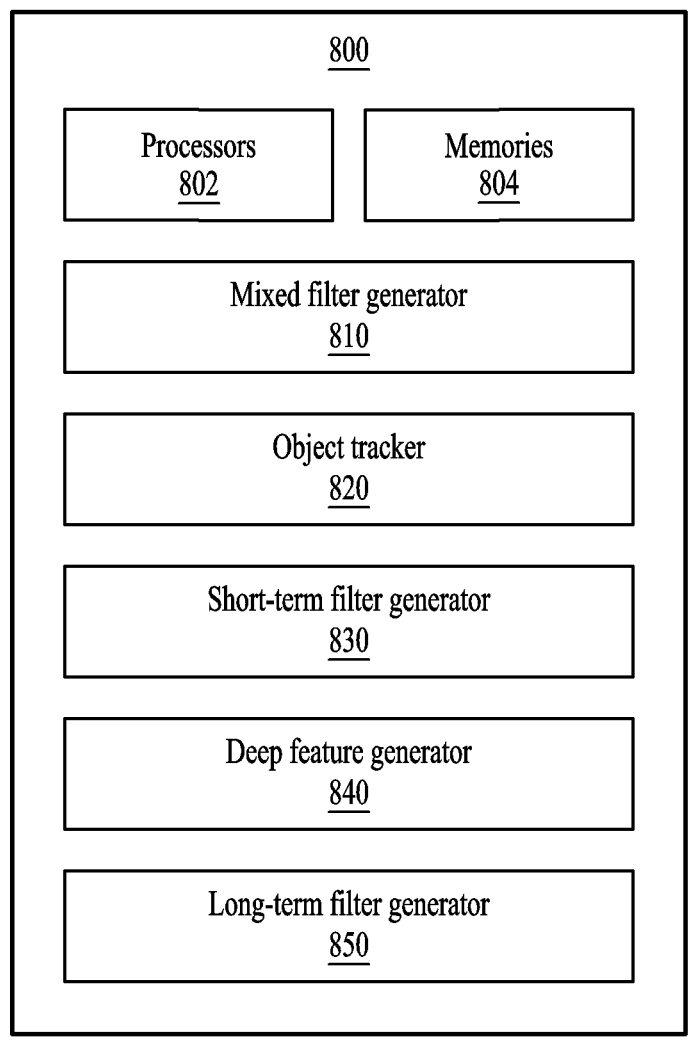
FIG. 8 illustrates an example computing apparatus with object tracking according to one or more embodiments.

FIG. 8 illustrates an example computing apparatus according to one or more embodiments.

Referring to FIG. 8, an object tracking apparatus 800 may be a computing apparatus include one or more processors 802, one or more memories 804, a mixed filter generator 810, an object tracker 820, a short-term filter generator 830, a deep feature generator 840, and a long-term filter generator 850. The one or more processors 802 are configured to execute instructions, the one or more memories store the instructions, and the execution of the instructions by the one or more processors may configure any one or any combination of the mixed filter generator 810, the object tracker 820, the short-term filter generator 830, the deep feature generator 840, and the long-term filter generator 850 to operate as described below.

The mixed filter generator 810 may be configured to generate a mixed filter by fusing a short-term filter with a long-term filter. The short-term filter may be generated based on the prediction of a current frame image in a video sequence. The long-term filter may be either a previously generated long-term filter or may be generated by optimizing the previously obtained long-term filter based on an object template feature pool. The object tracker 820 may be configured to perform object tracking on the current frame image based on the mixed filter.

The short-term filter generator 830 may be configured to generate a short-term filter corresponding to the current frame image through prediction based on a first frame image, the current frame image, and an auxiliary frame image of the video sequence. In an example, the auxiliary frame image may be an image frame having a greater tracking success confidence than a first predetermined threshold value and may be closest to the current frame in time order of the video sequence.

As a non-limiting example, the accumulated deep features of the object template feature pool may include: the deep feature of a current search region $C_t$ that is the object search region of the current frame image; a plurality of deep features generated by performing multi-augmentation on a first search region $C_0$ that is the object search region of the first frame image in the video sequence to generate a plurality of augmented feature images and by then extracting features for the plurality of augmented images; and/or the deep feature of an image frame having a greater success confidence than the first predetermined threshold value when object tracking is performed for an image frame prior to the current frame image in the video sequence. In an example, the accumulated deep features of the object template feature pool may be repeatedly updated during a process of tracking a target object according to the object tracking methods described herein.

The deep feature generator 840 may be configured to extract features with respect to the first search region $C_0$ that is the object search region of the first frame image, an auxiliary search region $C_n$ that is the object search region of the auxiliary frame image, and the current search region $C_t$ that is the object search region of the current frame image. Thereafter, the deep feature generator 840 may generate a first deep feature $F_O$ that is the deep feature of the first search region $C_0$, an auxiliary deep feature $F_n$ that is the deep feature of the auxiliary search region $C_n$, and a current deep feature $F_t$ that is the deep feature of the current search region $C_t$.

In an example, the first search region $C_0$ may be determined according to a first bounding box $b_O$ that is the bounding box of an object of the first frame image 412. The auxiliary search region $C_n$ may be determined according to an auxiliary bounding box $b_n$ that is the bounding box of an object of the auxiliary frame image 413. In addition, the current search region $C_t$ may be determined according to a prediction bounding box by that is the bounding box of an object predicted based on N number of frame images before the current frame image 411. In this case, N may be an integer greater than or equal to 1. Specifically, the computing apparatus 800 may determine the predicted bounding box bp according to the bounding box of a target object in a frame image prior to the current frame image 411 and then perform clipping on the current image frame 411 according to the predicted bounding box $b_p$ to obtain the current search region $C_t$.

In addition, the deep feature generator 840 may perform multi-augmentation processing on the first search region $C_0$ to generate a plurality of augmented images 414, may extract features from the plurality of augmented images 414, and may generate a plurality of deep features.

The short-term filter generator 830 may be configured to predict the short-term filter by performing an operation described below. The short-term filter generator 830 may obtain an object state encoding vector by performing object state encoding on the first deep feature $F_O$, the first bounding box $b_0$, the auxiliary deep feature $F_n$, and the auxiliary bounding box $b_n$ and may also obtain a current frame encoding vector by performing current frame encoding on the current deep feature $F_t$ that is the deep feature of the current search region $C_t$. The short-term filter generator 830 may obtain a hidden feature by processing the object state encoding vector and the current frame encoding vector through a trained transformer model and may obtain a short-term filter by linearly transforming the hidden feature.

When the current frame image is an image frame at a predetermined position in the video sequence, the long-term filter generator 850 may be configured to generate a long-term filter by optimizing a previously generated long-term filter based on an object template feature pool, or when the current frame image is not an image frame at a predetermined position in the video sequence, the long-term filter generator 850 may determine the previously obtained long-term filter to be the long-term filter.

The long-term filter generator 850 may be configured to optimize the previously generated long-term filter through an operation described below. The long-term filter generator 850 may extract a predetermined number of deep features and bounding boxes of a target object corresponding to respective ones of the accumulated deep features from the object template feature pool, may determine the extracted deep features and bounding boxes to be a filter training set, and may determine, based on the filter training set, the long-term filter by training and/or optimizing the previously generated long-term filter through a filter optimization algorithm.

The mixed filter generator 810 may perform correlation processing on the current frame image using the short-term filter and the long-term filter, to thus generate a short-term object positioning response map and a long-term object positioning response map and may fuse the short-term filter with the long-term filter to generate a mixed filter according to the short-term object positioning response map and the long-term object positioning response map.

In an example, the mixed filter generator 810 may be configured to fuse the short-term filter with the long-term filter through an operation described below. The mixed filter generator 810 may evaluate short-term positioning map quality $Q_{st}$ of the short-term object positioning response map and long-term positioning map quality $Q_{lt}$ of the long-term object positioning response map. For example, the computing apparatus 800 may use an APCE algorithm to perform the evaluating, as shown in Equation 1 described above. In addition, the mixed filter generator 810 may determine a mixture weight $W_{st}$ of the short-term filter $f_{st}$ and a mixture weight $W_{lt}$ of the long-term filter $f_{lt}$ according to a result of comparing a second predetermined threshold value to the short-term positioning map quality $Q_{st}$ and the long-term positioning map quality $Q_{lt}$. In addition, the mixed filter generator 810 may generate a mixed filter by fusing the short-term filter with the long-term filter according to the mixture weight $w_{st}$ of the short-term filter and the mixture weight $w_{lt}$ of the long-term filter. For example, the mixed filter generator 810 may perform a fusion operation according to Equation 2 described above.

The mixed filter generator 810 may be configured to determine the mixture weight $w_{st}$ of the short-term filter $f_{st}$ and the mixture weight $w_{lt}$ of the long-term filter $f_{lt}$ through an operation described below.

When the short-term positioning map quality $Q_{st}$ is greater than or equal to the second predetermined threshold value and the long-term positioning map quality $Q_{lt}$ is less than the second predetermined threshold value, the mixed filter generator 810 may set the mixture weight $w_{st}$ of the short-term filter as 1 and the mixture weight $w_{lt}$ of the long-term filter as 0.

When the short-term positioning map quality $Q_{st}$ is less than the second predetermined threshold value and the long-term positioning map quality $Q_{lt}$ is greater than or equal to the second predetermined threshold value, the mixed filter generator 810 may set the mixture weight $w_{st}$ of the short-term filter as 0 and the mixture weight $w_{lt}$ of the long-term filter as 1.

When both the short-term positioning map quality $Q_{st}$ and the long-term positioning map quality $Q_{lt}$ are less than the second predetermined threshold value, the mixed filter generator 810 may set the mixture weight $w_{st}$ of the short-term filter and the mixture weight $w_{lt}$ of the long-term filter as a weight corresponding to the previously obtained mixed filter.

When both the short-term positioning map quality $Q_{st}$ and the long-term positioning map quality $Q_{lt}$ are greater than or equal to the second predetermined threshold value, the mixed filter generator 810 may set $w_{st}$ and $w_{lt}$ as a mixture weight of a normalized output of a Softmax($Q_{st}$, $Q_{lt}$) activation function.

In an example, the mixed filter generator 810 may be configured to fuse the short-term filter with the long-term filter through an operation described below. The mixed filter generator 810 may obtain the mixture weight $w_{st}$ of the short-term filter and the mixture weight $w_{lt}$ of the long-term filter by using a CNN and a normalization function, according to the short-term object positioning response map and the long-term object positioning response map. The mixed filter generator 810 may obtain a mixed filter by fusing the short-term filter and the long-term filter according to the mixture weight $w_{st}$ of the short-term filter and the mixture weight $w_{lt}$ of the long-term filter.

The mixed filter generator 810 may be configured to generate the mixture weight $w_{st}$ of the short-term filter and the mixture weight $w_{lt}$ of the long-term filter by using the CNN and the normalization function through the following operation.

The mixed filter generator 810 may obtain a mixed response map by mixing and processing the short-term object positioning response map and the long-term object positioning response map. For example, the mixed filter generator 810 may perform the mixing according to Equation 3 described above. In addition, the mixed filter generator 810 may extract features from the mixed response map by using the CNN and may linearly transform the extracted features by using a linear transformation layer to generate a mixture weight vector. Furthermore, the mixed filter generator 810 may normalize the mixture weight vector according to the Softmax activation function to generate the mixture weight $w_{st}$ of the short-term filter and the mixture weight $w_{lt}$ of the long-term filter. For example, the mixed filter generator 810 may normalize the mixture weight vector according to Equation 4 described above.

Figure 9:
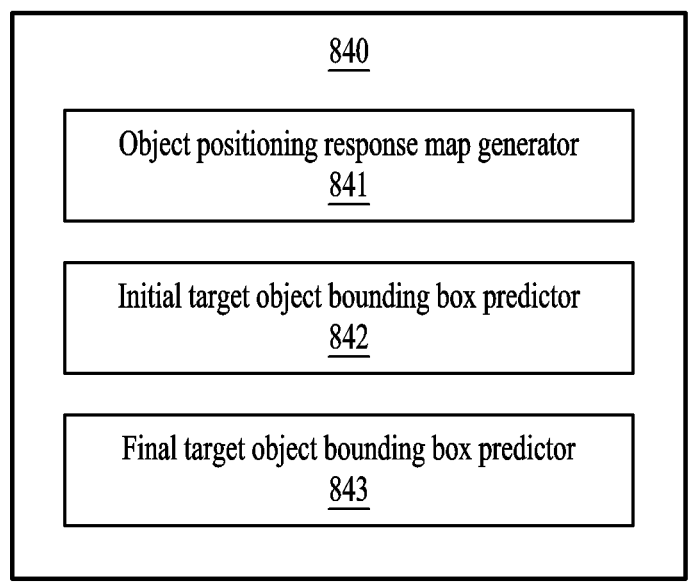
FIG. 9 illustrates an example object tracker according to one or more embodiments.

FIG. 9 illustrates an example of an object tracker according to one or more embodiments.

Referring to FIG. 9, an object tracker 820 may include an object positioning response map generator 841, an initial target object bounding box predictor 842, and a final target object bounding box predictor 843.

The object positioning response map generator 841 may be configured to obtain an object positioning response map by performing correlation processing on a deep feature $F_t$ of an object search region $C_t$ of a current frame image by using a mixed filter. In an example, the object search region $C_t$ of the current frame image may be determined according to a bounding box $b_p$ of a predicted object based on N number of frame images prior to the current frame image. In this case, N may be an integer greater than or equal to 1.

The initial target object bounding box predictor 842 may be configured to predict an initial target object bounding box of the current frame image based on the object positioning response map.

The final target object bounding box predictor 843 may be configured to segment a target object based on the initial target object bounding box by using a segmentation network and may obtain a target object segmentation map of the target object and a bounding box of a final target object.

The technical solutions provided by the examples of the present disclosure may have at least the following advantageous effects. The technical solutions may fuse the long-term filter with short-term filter to obtain the advantages of both long-term and short-term filters in the object tracking process. For example, the long-term filter may take a tracking result collected during the object tracking process as a training set, may continuously train/optimize filter parameters online to generate a feature representation for long-term tracking of the target object, and may have great robustness and stability. The process of determining the short-term filter may include mining the features of a closest reliable tracking frame (i.e., an auxiliary frame) by using a network of offline training, directly predicting short-term filter parameters, and generating/obtaining the feature representation of short-term filter parameters that may help discrimination tracking. Therefore, one or more of the technical solutions proposed in the above non-limiting examples may prevent performance degradation caused by an error in tracking a specific frame and improve discrimination of the tracker.

The processors, memories, computing apparatuses, and other apparatuses, devices, and components described herein with respect to FIGS. 1-9 are implemented by or representative of hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above implementing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions herein, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, in addition to the above disclosure, the scope of the disclosure may also be defined by the claims and their equivalents, and all variations within the scope of the claims and their equivalents are to be construed as being included in the disclosure.

What is claimed is:

1. A processor-implemented method, comprising:
generating a mixed filter by fusing a short-term filter with a long-term filter; and
performing object tracking on a current frame image based on the mixed filter,
wherein the short-term filter is dependent on a prediction of the current frame image in a video sequence, and
the long-term filter is a previously generated long-term filter or is generated by optimizing the previously generated long-term filter based on an object template feature pool.

2. The method of claim 1, further comprising, prior to the generating of the mixed filter, predicting the short-term filter based on a first frame image of the video sequence, the current frame image and an auxiliary frame image of the video sequence,
wherein the auxiliary frame image is an image frame that has a determined greater tracking success confidence than a first threshold value and is closest to the current frame image in time sequence.

3. The method of claim 2, wherein the predicting of the short-term filter comprises:
extracting features, through a feature extraction network, for a first search region from the first frame image, an auxiliary search region from the auxiliary frame image, and a current search region from the current frame image, and extracting a first deep feature of the first search region, an auxiliary deep feature of the auxiliary search region, and a current deep feature of the current search region;
generating an object state encoding vector by performing object state encoding on the first deep feature, a first bounding box of the first frame image with respect to the object, the auxiliary deep feature, and an auxiliary bounding box of the auxiliary frame image with respect to the object;
obtaining a current frame encoding vector by performing encoding on the current deep feature;
generate a hidden feature using a trained transformer model provided an input based on the object state encoding vector and the current frame encoding vector to thus; and
generating the short-term filter by linearly transforming the hidden feature,
wherein the first search region is determined according to the first bounding box,
the auxiliary search region is determined according to the auxiliary bounding box, and
the current search region is determined according to a predicted bounding box of a predicted object based on N number of frame images prior to the current frame image, wherein N is an integer greater than or equal to 1.

4. The method of claim 1, further comprising, prior to the generating of the mixed filter,
in response to the current frame image being determined to be an image frame at a predetermined position in the video sequence, generating the long-term filter by optimizing the previously obtained long-term filter based on the object template feature pool; or
in response to the current frame image being determined to not be an image frame at the predetermined position in the video sequence, generating the previously obtained long-term filter as the long-term filter.

5. The method of claim 1, wherein the optimizing of the previously obtained long-term filter comprises:
extracting a predetermined number of deep features and bounding boxes of the object corresponding to respective ones of accumulated deep features from the object template feature pool and determining the extracted deep features and bounding boxes to be a filter training set; and
training and/or optimizing, based on the filter training set, the previously obtained long-term filter through a filter optimization algorithm.

6. The method of claim 1, wherein the generating of the mixed filter by fusing the short-term filter with the long-term filter comprises:
generating a short-term object positioning response map and a long-term object positioning response map by respectively performing correlation processing on the current frame image using the short-term filter and the long-term filter; and
generating the mixed filter by fusing the short-term filter with the long-term filter according to the short-term object positioning response map and the long-term object positioning response map.

7. The method of claim 6, wherein the generating of the mixed filter further comprises:
evaluating short-term map quality of the short-term object positioning response map, and long-term map quality of the long-term object positioning response map;
determining a mixture weight of the short-term filter and a mixture weight of the long-term filter according to a result of comparing a second predetermined threshold value to the short-term map quality and the long-term map quality; and
generating the mixed filter by fusing the short-term filter with the long-term filter according to the mixture weight of the short-term filter and the mixture weight of the long-term filter.

8. The method of claim 7, wherein the determining of the mixture weight of the short-term filter and the mixture weight of the long-term filter comprises:
in response to the short-term map quality being determined greater than or equal to the second predetermined threshold value and the long-term map quality is less than the second predetermined threshold value, setting the mixture weight of the short-term filter as 1 and the mixture weight of the long-term filter as 0;
in response to the short-term map quality being determined less than the second predetermined threshold value and the long-term map quality is greater than or equal to the second predetermined threshold value, setting the mixture weight of the short-term filter as 0 and the mixture weight of the long-term filter as 1;
in response to both the mixture weights of the short-term filter and the long-term map being determined to have respective qualities that are less than the second predetermined threshold value, setting each of the mixture weights as a weight value corresponding to a previously obtained mixed filter; or
in response to both the mixture weights of the short-term filter and the long-term map being determined to have respective qualities that are greater than or equal to the second predetermined threshold value, setting each of the mixture weights as a mixture weight of a normalized output of a Softmax activation function of the short-term map quality and the long-term map quality.

9. The method of claim 6, wherein the generating of the mixed filter further comprises:
generating a mixture weight of the short-term filter and a mixture weight of the long-term filter by using a convolutional neural network and a normalization function, according to the short-term object positioning response map and the long-term object positioning response map; and
generating the mixed filter by fusing the short-term filter with the long-term filter according to the mixture weight of the short-term filter and the mixture weight of the long-term filter.

10. The method of claim 9, wherein the generating of the mixture weight of the short-term filter and the mixture weight of the long-term filter further comprises:
generating a mixed response map by mixing and processing the short-term object positioning response map and the long-term object positioning response map;
extracting a feature from the mixed response map using the convolutional neural network, and generating a mixture weight vector by linearly transforming the extracted feature using a linear transformation layer; and
generating the mixture weight of the short-term filter and the mixture weight of the long-term filter by normalizing the mixture weight vector according to a Softmax activation function.

11. The method of claim 1, wherein the performing of the object tracking further comprises:
generating, using the mixed filter, an object positioning response map by performing correlation processing on a current deep feature of an object search region of the current frame image;
predicting an initial target object bounding box of the current frame image based on the object positioning response map; and
segmenting a target object by using a segmentation network based on the initial target object bounding box and generating a target object segmentation map of the target object and a bounding box of a final target object,
wherein the object search region of the current frame image is determined according to a bounding box of a predicted target object based on N number (N is an integer greater than or equal to 1) of frame images prior to the current frame image.

12. The method of claim 1, wherein the object template feature pool comprises accumulated deep features including at least:
a deep feature of an object search region of the current frame image;
a plurality of deep features obtained by performing multi-augmentation processing on an object search region of a first frame image of the video sequence to obtain a plurality of augmented images and extracting features with respect to the plurality of augmented images; and/or a deep feature of an image frame having a determined greater tracking success confidence than a first predetermined threshold value when object tracking is performed on an image frame prior to the current frame image in the video sequence.

13. A non-transitory computer-readable storage medium storing instructions that, when executed by one or more processors, cause the one or more processors to perform the method of claim 1.

14. A computing apparatus comprising:
one or more processors configured to execute instructions; and
one or more memories storing the instructions,
wherein the execution of the instructions by the one or more processors configures the one or more processors to control:
a mixed filter generator to generate a mixed filter by fusing a short-term filter with a long-term filter; and
an object tracker to perform object tracking on a current frame image based on the mixed filter,
wherein
the short-term filter is dependent on a prediction of the current frame image in a video sequence, and
the long-term filter is a previously obtained long-term filter or is obtained by optimizing the previously obtained long-term filter based on an object template feature pool.

15. The computing apparatus of claim 14, wherein the one or more processors are configured to further control a short-term filter generator to predict the short-term filter based on a first frame image of the video sequence, the current frame image and an auxiliary frame image of the video sequence,
wherein the auxiliary frame image is an image frame that has a determined greater tracking success confidence than a first threshold value and is closest to the current frame image in time sequence.

16. The computing apparatus of claim 14, wherein the one or more processors are configured to further control a long-term filter generator, in response to the current frame image being determined to be an image frame at a predetermined position in the video sequence to generate the long-term filter by optimizing the previously obtained long-term filter based on the object template feature pool, or in response to the current frame image being determined to not be an image frame at the predetermined position in the video sequence, to generate the previously obtained long-term filter as the long-term filter.

17. The computing apparatus of claim 14, wherein the mixed filter generator is configured to:
generate a short-term object positioning response map and a long-term object positioning response map by respectively performing correlation processing on the current frame image, using the short-term filter and the long-term filter; and
generate the mixed filter by fusing the short-term filter with the long-term filter according to the short-term object positioning response map and the long-term object positioning response map.

18. The computing apparatus of claim 17, wherein, the mixed filter generator is further configured to:
evaluate short-term map quality of the short-term object positioning response map, and long-term map quality of the long-term object positioning response map;
determine a mixture weight of the short-term filter and a mixture weight of the long-term filter according to a result of comparing a second predetermined threshold value to the short-term map quality and the long-term map quality; and
generate the mixed filter by fusing the short-term filter with the long-term filter according to the mixture weight of the short-term filter and the mixture weight of the long-term filter.

19. The computing apparatus of claim 17, wherein, the mixed filter generator is further configured to:
generate a mixture weight of the short-term filter and a mixture weight of the long-term filter by using a convolutional neural network and a normalization function, according to the short-term object positioning response map and the long-term object positioning response map; and generate the mixed filter by fusing the short-term filter with the long-term filter according to the mixture weight of the short-term filter and the mixture weight of the long-term filter.

20. The computing apparatus of claim 14, wherein the object tracker comprises:

an object positioning response map generator configured to obtain, using the mixed filter, an object positioning response map by performing correlation processing on a current deep feature of an object search region of the current frame image;

an initial target object bounding box predictor configured to predict an initial target object bounding box of the current frame image based on the object positioning response map; and a final target object bounding box predictor configured to segment a target object by using a segmentation network based on the initial target object bounding box and generating a target object segmentation map of the target object and a bounding box of a final target object, wherein the object search region of the current frame image is determined according to a bounding box of a predicted target object based on N number (N is an integer greater than or equal to 1) of frame images prior to the current frame image.

* * * * *